United States Patent [19]

Hirose et al.

[11] Patent Number: 4,546,155

[45] Date of Patent: Oct. 8, 1985

[54] LATENT CURING AGENTS FOR EPOXY RESINS

[75] Inventors: Takeshi Hirose, Kawasaki; Nobuo Ito, Oisomachi; Kiyomiki Hirai, Kawasaki; Koji Takeuchi, Yokohama, all of Japan

[73] Assignee: Ajinomoto Co., Inc., Tokyo, Japan

[21] Appl. No.: 654,470

[22] Filed: Sep. 26, 1984

[30] Foreign Application Priority Data

Sep. 30, 1983 [JP] Japan .................................. 58-182528

[51] Int. Cl.$^4$ .............................................. C08G 59/58
[52] U.S. Cl. ................................... 525/504; 528/100; 528/103; 528/109; 528/111; 528/113; 528/341; 548/335; 560/85; 560/87; 560/88; 560/120; 560/127; 560/195; 560/196
[58] Field of Search ................ 525/504; 528/103, 111, 528/113, 341, 100, 109; 548/335; 560/85, 87, 88, 120, 127, 196, 195

[56] References Cited

U.S. PATENT DOCUMENTS

| | | | |
|---|---|---|---|
| 4,066,625 | 1/1978 | Bolger | 528/103 X |
| 4,130,510 | 12/1978 | Tanaka et al. | 525/504 |
| 4,268,656 | 5/1981 | Ray-Chaudhuri et al. | 528/111 X |
| 4,296,231 | 10/1981 | Gutekunst et al. | 528/111 X |
| 4,339,369 | 7/1982 | Micks et al. | 528/111 X |
| 4,366,274 | 12/1982 | Pampouchidis et al. | 528/111 X |

*Primary Examiner*—Earl Nielsen
*Attorney, Agent, or Firm*—Oblon, Fisher, Spivak, McClelland & Maier

[57] ABSTRACT

A latent curing agent for epoxy resin, characterized in that the latent curing agent is an adduct obtained by reacting (a) a polyfunctional epoxy compound, (b) a compound having at least one OH, NH$_2$, NH or SH group together with a tertiary amino group in the molecule and (c) a carboxylic acid anhydride is a good curing agent for epoxy resins. The present curing agent is useful in formulating storable, one-package, heat-curable epoxy resin-based compositions.

11 Claims, No Drawings

LATENT CURING AGENTS FOR EPOXY RESINS

BACKGROUND OF THE INVENTION

1. Field of the Invention

The present invention relates to a latent curing agent for epoxy curing resins. More particularly, it relates to a latent curing agent for epoxy resins which causes rapid resin curing at moderate, elevated temperatures and which gives epoxy resin compositions having excellent storage stability at room temperature.

2. Description of the Prior Art

One-pack type epoxy resins are preferable to the conventional two-pack type epoxy resins because the former cannot be misformulated and can be used continuously. One-pack type epoxy resins require a so-called latent curing agent which does not react with epoxy compounds at room temperature, but upon heating, reacts with epoxy compounds to effect curing.

Heretofore, several latent curing agents have been proposed. Representative examples include boron trifluoride-amine adduct, dicyandiamide, and dibasic acid dihydrazide. Boron trifluoride-amine adduct is hard to treat because it is very hygroscopic and it adversely affects the physical properties of the cured resin. The latter two curing agents are useful in formulating epoxy resin compositions having excellent storage stability, but full curing by means of these compounds can only be achieved by heating the resin at temperatures higher than 150° C. for a long time. To save energy and not to damage surrounding components, rapid curing at a low temperature is required.

It is known that an amine type curing agent contributes improved workability to the system being converted into an adduct with an epoxy resin. It has recently been disclosed that an adduct obtained by the reaction of an imidazole compound with an epoxy compound is a comparatively good latent curing agent. (See U.S. Pat. No. 4,066,625.) For example, an adduct obtained by the reaction of 2-ethyl-4-methylimidazole with Epon 834 (bisphenol A type epoxy resin; a product of Shell Chemical Co., epoxy equivalent 230~270) has a softening temperature of 100° to 125° C. However, it is a general observation that formulated resins which have good reactivity have poor storage stability, or if the resin has good storage stability, it has poor reactivity. Moreover, the range of good reaction ratios is very narrow. Epoxy resin compositions which incorporate an adduct therein and which are obtained by the reaction of one equivalent of epoxy groups in the epoxy resin (Epon 834) with one equivalent of the secondary amino group of 2-ethyl-4-methylimidazole with curing at 100° C. for thirty minutes, exhibit poor storage stability (4 days at 35° C., 2 days at 40° C.). Epoxy resin compositions which incorporate an adduct therein and which are obtained by the reaction of two equivalents of epoxy groups in the epoxy resin (Epon 834) with one equivalent of 2-ethyl-4-methylimidazole, have good storage stability (>14 days at 35° C.), but exhibit poor reactivity. These adducts cure at low temperatures when they are used with other curing agents, and accordingly are superior as curing agents to an adduct of an aliphatic amine with an epoxy compound as latent curing agents. However, they are insufficient as latent curing agents which cure at 100°~130° C. and exhibit superior storage stability.

It is known that an adduct obtained by the reaction of N-methylpiperazine with an epoxy compound can be used as a latent curing agent (see U.S. Pat. No. 4,268,656). However, this adduct alone is not effective as a latent curing agent and must be used with another curing agent.

In short, the adduct of an aliphatic amine and an epoxy compound does not improve the storage stability of epoxy resin very much. In the case of a specific amine compound, i.e., the adduct which is formed between the amine compound and the epoxy compound, it is rare to find a curing agent which satisfies both reactivity and storage stability requirements for a one-pack type epoxy resin. A need therefore continues to exist for an improved curing agent for a one-pack type epoxy resin.

SUMMARY OF THE INVENTION

Accordingly, one object of the present invention is to provide a curing agent for a one-pack epoxy resin composition which effectively cures the resin at low temperatures and which provides for superior storage of the resin.

Briefly, these objects and other objects of the present invention as hereinafter will become more readily apparent can be attained by a curing agent for epoxy resins which is obtained by reacting (a) a polyfunctional epoxy compound, (b) a compound having at least one functional OH, $NH_2$, NH or SH group together with a tertiary amino group in the molecule, and (c) a carboxylic acid anhydride.

DETAILED DESCRIPTION OF THE PREFERRED EMBODIMENTS

The discovery of the present invention is a latent curing agent for an epoxy resin which effects curing at low temperature and provides for superior storage stability of the resin. The present curing agent is superior to the above-described conventional curing agent which is an adduct of an amine type curing agent and an epoxy compound. The present latent curing agent is an adduct obtained by reacting a compound having active hydrogen together with a teritary amino group in the molecule, an epoxy compound and a carboxylic acid anhydride.

The key to the present invention is the third ingredient of the same which is the carboxylic acid anhydride compound which improves the storage stability of the composition without impairing the reactivity of the same. The present latent curing agent now makes it possible to conduct curing at a low temperature, while providing for superior storage stability. Further, the addition of the carboxylic acid anhydride component provides for the latent curing of the epoxy resin over a wide range of reaction ratios of an amine compound to an epoxy compound.

The active hydrogen compound which also contains a tertiary amino group cannot only be provided with a —$NH_2$ group or a —NH group, but also with a —OH group or a SH group. Accordingly, it has been found that the addition product obtained by reacting (a) a polyfunctional epoxy compound, (b) a compound having at least one —OH, —$NH_2$, —NH or —SH group together with a tertiary amino group in the molecule and (c) a carboxylic acid anhydride provides a latent curing agent which meets the objectives of this invention.

The polyfunctional epoxy compound as the raw material of the latent curing agent of the present invention may be any compound having two or more epoxy groups in the molecule. Suitable examples include polyglycidyl ether obtained by reacting a polyhydric phenol such as bisphenol A, bisphenol F, catechol, or resorcinol or a polyhydric alcohol such as glycerin or polyethylene glycol with epichlorohydrin; glycidyl ether ester obtained by reacting a hydrocarboxylic acid such as hydroxybenzoic acid and β-hydroxynaphthoic acid with epichlorohydrin; polyglycidyl ester obtained from a polycarboxylic acid such as terephthalic acid; a glycidylamine compound obtained from 4,4'- diaminodiphenylmethane and m-aminophenol; and epoxidized novolak and epoxidized polyolefin.

The compound containing at least one OH, $NH_2$, NH or SH group together with a tertiary amino group in the molecule, which is reacted with the above-mentioned polyfunctional epoxy compound, includes compounds represented by the formula:

wherein X is —OH, —$NH_2$, —NH, or —SH; $R_1$ and $R_2$ are $C_{1-20}$ alkyl group, $C_{2-20}$ alkenyl groups, and aromatic hydrocarbon groups such as phenyl or benzyl, with or without a substituent such as oxygen, halogen, or a functional group as represented by the group X defined above; and $R_3$ is a divalent residue of $R_1$ or $R_2$. $R_1$ and $R_2$ may connect with each other to form a ring, or $R_1$, $R_2$ and $R_3$ may connect with one another to form a ring.

The compounds which contain at least one active hydrogen atom bearing functional group include compounds of the following formula (2) below which contain tertiary amino groups within the heterocyclic ring system.

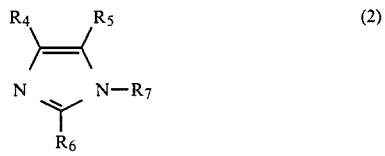

wherein $R_4$, $R_5$, $R_6$ and $R_7$ are hydrogen atoms, groups defined by $R_1$ and $R_2$ above, or the functional groups defined as X above; and $R_7$ is a hydrogen atom or at least one of $R_4$, $R_5$, $R_6$, and $R_7$ is a functional group as defined for group X above.

Representative examples of the compound containing at least one —OH, —$NH_2$, —NH or —SH group together with a tertiary amino group include the following compounds: 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris(dimethylaminomethy)phenol, N-β-hydroxyethyl morpholine, 2-dimethylaminoethylamine, 3-dimethylamino-n-propylamine, 2-diethylaminoethylamine, 3-diethylamino-n-propylamine, N-methylpiperazine, imidazole, 2-methylimidazole, 2-ethylimidazole, 2-ethyl-4-methylimidazole, 2-isopropylimidazole, 2-undecylimidazole, 2-octadecylimidazole, 2-phenylimidazole, 2-phenyl-4-methylimidazole, 2-dimethylaminoethanethiol, methimidazole, 2-mercaptobenzoimidazole, 2-mercaptobenzothiazole and the like.

Suitable examples of the carboxylic acid anhydride compound include succinic anhydride, phthalic anhydride, tetrahydrophthalic anhydride, methyl tetrahydrophthalic anhydride, hexahydrophthalic anhydride, methyl hexahydrophthalic anhydride, methyl nadic anhydride, dodecenylsuccinic anhydride, pyromellitic dianhydride, 5-(2,5-diketotetrahydrofuryl)-3-methylcyclohexene-1,2-dicarboxylic anhydride and the like.

To produce an addition compound which is the latent curing agent of the present invention, components (a), (b) and (c) are reacted in a ratio of 0.4~2 equivalent, preferably 0.5~1.5 equivalent of active hydrogen in component (b) and 0.25~2.5 equivalent, preferably 0.7~2.0 equivalent of carboxylic acid anhydride component (c) per one equivalent of epoxy group in component (a).

If the equivalent number of component (b) is less than 0.4 equivalent per one equivalent of epoxy group in component (a), epoxy resins which contain such an addition product are slow in curing.

If the equivalent number of component (b) is more than two equivalents per one equivalent of epoxy group in component (a), the resulting addition product has a low softening point and cannot be readily crushed. Epoxy resins containing such an addition product exhibit poor storage stability.

If the equivalent number of component (c) is less than 0.25 equivalent per one equivalent of epoxy group in component (a), the effect of component (c) does not appear.

If the equivalent number of component (c) is more than 2.5 equivalent per one equivalent of epoxy group, the addition product has a low softening point and epoxy resins containing such a product exhibit poor storage stability.

Two or more compounds may be mixed for each of components (a), (b) and (c), so long as they are used in the quantities specified above.

The latent curing agent of this invention can be easily obtained by thoroughly mixing components (a), (b) and (c), gelling them at room temperature or at an elevated temperature, reacting the mixture at 80° to 150° C., cooling, solidifying, and crushing. The reaction of the components can also be conducted in a solvent such as tetrahydrofuran, dioxane, or methyl ethyl ketone, after which the solvent is removed and the remaining solid is crushed.

The latent curing agent of the present invention can be used in combination with a known curing agent such as an acid anhydride, a dicyandiamide, a dibasic acid hydrazide, guanamine, or melamine. The latent curing agent of the present invention can be applied to a variety of known epoxy resins having two or more epoxy groups in one molecule. The latent curing agent of the present invention should be used in an amount of 0.5 to 40 parts by weight of 100 parts by weight of epoxy resin. If the quantity is less than 0.5 part by weight, a satisfactory curing performance is not obtained, and the use of more than 40 parts by weight of curing agent impairs the performance of the cured product.

Suitable representative examples of epoxy resins which can be combined with the latent curing agent of the present invention include those based on glycidyl ethers of polyhydric phenols such as 2,2-bis(4-hydroxyphenyl)-propane (Bisphenol A), resorcinol, hydroquinone, pyrocatechol, saligenin, Bisphenol F and phenolformaldehyde resin.

If necessary, other curing agents, cure accelerator and fillers may be employed in combination with the curing agent of the present invention.

Having generally described this invention, a further understanding can be obtained by reference to certain specific examples which are provided herein for purposes of illustration only and not intended to be limiting unless otherwise specified.

The following examples illustrate the preparation of the latent curing agents and their use as a curing agent for an epoxy resin. The abbreviations for the raw materials employed in the examples are as follows:

(a) Polyfunctional epoxide
Epon 828 ( a product of Shell Chemical Co.): Bisphenol A type epoxy resin epoxy equivalent 184~194
Epon 1001 (a product of Shell Chemical Co.): Bisphenol A type epoxy resin epoxy equivalent 450~500
Epon 807 ( a product of Shell Chemical Co.): Bisphenol F type epoxy resin epoxy equivalent 166~175
Epon 834 ( a product of Shell Chemical Co.): Bisphenol A type epoxy resin epoxy equivalent 230~270

(b) Representative organic compounds which contain at least one OH, $NH_2$, NH and SH group together with a tertiary amino group in the molecule have the following abbreviations:
DMAE: 2-Dimethylaminoethanol
PG-MZ: 1-(2-Hydroxy-3-phenoxypropyl)-2-methylimidazole
DMP-30: 2,4,6-Tris(dimethylaminomethyl)phenol
DMP-10: 2-(Dimethylaminomethyl)phenol
DMAPA: 3-Dimethylamino-n-propylamine
MZ: 2-Methylimidazole
EMZ: 2-Ethyl-4-methylimidazole
SMZ: Methimidazole (c) Carboxylic acid anhydrides:
PA: Phthalic anhydride
MTHPA: Methyl tetrahydrophthalic anhydride
MHHPA: Methyl hexahydrophthalic anhydride
DDSA: Dodecenylsuccinic anhydride
EXPA: 5-(2,5-diketotetrahydrofuryl)-3-methyl-3-cyclohexene-1,2-dicarboxylic anhydride

EXAMPLE 1

Preparation of the addition product of Epon 828, DMAE and MHHPA

A 38 gram amount (0.2 equivalent) of Epon 828 was sufficiently mixed with 8.4 g (0.5 equivalent) of MHHPA at room temperature, and to the mixture was added 8.9 g (0.1 equivalent) of DMAE. The temperature was raised gradually while being stirred. When the viscosity started to increase, the temperature was maintained at 80° C. for thirty minutes, and further maintained at 100° C. for an hour. The reaction mixture was cooled to room temperature whereby a brown-red solid was obtained. This product was ground to a powder and is referred to as sample No. 2.

EXAMPLE 2

Preparation of addition product of Epon 828, EMZ and PA

A 15 gram amount (0.1 equivalent) of PA and 10 g of methyl ethyl ketone as solvent were mixed. The mixture was heated at 60° C., and 11 g (0.1 equivalent) of EMZ was added to the mixture. The mixture was stirred to a slurry, and then 19 g (0.1 equivalent) of Epon 828 was added to the mixture. The temperature was raised gradually with stirring. When the reaction started at approximately 80° C., heating was stopped. After stirring the mixture to a viscous state, the mixture was heated at 100° C. for an hour, and the heated at 120° under reduced pressure to remove methyl ethyl ketone. The reaction mixture was cooled to room temperature, whereby a pale yellowish solid was obtained. This product was ground to a powder and is referred to as sample No. 15.

The sample numbers of the other products and their softening temperatures, prepared by similar procedures as described in the above examples are shown in Table 1.

TABLE 1

| Sample No. | (a) Component (Number of equivalents) | (b) Component (Number of equivalents) | (c) Component (Number of equivalents) | Softening Temperature (°C.) |
|---|---|---|---|---|
| 1 | 828 Epon (1) | DMAE (0.5) | PA (0.25) | 120 |
| 2 | 828 Epon (1) | DMAE (0.5) | MHHPA (0.25) | 90 |
| 3 | 828 Epon (1) | DMAE (0.5) | EXPA (0.25) | 130 |
| 4 | 1001 Epon (1) | PG-MZ (1) | DDSA (1) | 90 |
| 5 | 828 Epon (1) | DMP-30 (0.5) | MHHPA (0.25) | 110 |
| 6 | 828 Epon (1) | DMP-10 (0.5) | MHHPA (0.25) | 110 |
| 7 | 807 Epon (1) | DMP-10 (1) | MTHPA (1) | 120 |
| 8 | 828 Epon (1) | DMAPA (0.5) | PA (0.25) | 140 |
| 9 | 828 Epon (1) | DMAPA (0.75) | PA (0.5) | 90 |
| 10 | 828 Epon (1) | DMAPA (0.5) | MHHPA (0.25) | 100 |
| 11 | 807 Epon (1) | MZ (1) | MHHPA (1) | 120 |
| 12 | 828 Epon (1) | EMZ (1) | PA (0.5) | 110 |
| 13 | 828 Epon (1) | EMZ (1) | PA (1) | 110 |
| 14 | 1001 Epon (1) | EMZ (1.2) | PA (1.2) | 110 |
| 15 | 828 Epon (1) | EMZ (0.5) | MHHPA (0.5) | 130 |
| 16 | 828 Epon (1) | SMZ (0.5) | MHHPA (0.5) | 140 |

EXAMPLE 3

The reactivity, storage stability and glass transition temperature of the following formulated epoxy resin composition were evaluated as follows:

Fomulation

Epon 828: 100 parts by weight
Latent curing agent of the present invention: 20
ZnO: 5

1. Evaluation of reactivity:

(1) Onset temperature ($T_i$) and peak temperature ($T_p$) were measured by differential thermal analysis (DTA)

Sample weight: about 10 mg
Standard material: $\alpha$-$Al_2O_3$
Heating rate: 5° C./min.

(2) The sample was placed in a Geer's oven maintained at the prescribed temperature and the appearance of the resulting cured resin was observed.

2. Storage stability

The sample was placed in a Geer's oven set at 30° C. and the number of days required for the sample to become non-fluid was measured.

3. Glass transition temperature (T.g.)

The T.g. of the cured resin was measured with a thermal mechanical analysis apparatus (TMA, a product of Rigaku Corporation) by the TMA penetration method.

Rate of increasing temperature: 10° C./min.
Load: 10 g
Diameter of needle: 1 mm

The results obtained are summarized in Table 2 below:

TABLE 2

| Sample No. | Reactivity | | | | Storage stability (30°C.) | [a]Glass transition temp. (°C.) |
|---|---|---|---|---|---|---|
| | $T_i$(°C.) | $T_p$(°C.) | Curing temp. | time | | |
| 2 | 116 | 138 | 100° C. | 1 hour | 1 month | 98 |
| 4 | 114 | 124 | 100° C. | 30 min. | 1 month | 90 |
| 5 | 116 | 144 | 100° C. | 1 hour | 1 month | 113 |
| 11 | 122 | 130 | 100° C. | 1 hour | 1 month | 109 |
| 13 | 128 | 136 | 100° C. | 1 hour | 1 month | 114 |
| DMP-30 | 60 | 110 | 100° C. | 30 min. | 1 day | 105[b] |
| DMAE | 55 | 101 | 100° C. | 30 min. | 1 day | 97[b] |
| PG-MZ | 60 | 120 | 100° C. | 30 min. | 1 day | 112[b] |
| EMZ | 114 | 120 | 120° C. | 30 min. | 2 days | 108 |

[a]Cured at "Curing temp. time"
[b]Cured at 100° C. for 1 hour

Furthermore, a series of adducts obtained by the reaction of Epon 834 as component (a), EMZ as component (b) and MHHPA as component (c) were evaluated. The series was prepared by varying the reaction ratio of components (b) and (c) relative to component (a). The softening temperature of the adduct, reactivity, storage stability and glass transition temperature of each formulated epoxy resin composition were evaluated. The results obtained are summarized in Table 3. In addition, the adducts of an amine compound and an epoxy compound were evaluated as latent curing agents for comparative purposes. The results are summarized in Table 4.

TABLE 3

| EMZ[a] Number of equivalents / MHHPA Number of equivalents | Softening temp. (°C.) | Curing temp. | time | Storage stability | [b]Glass transition temp. (°C.) |
|---|---|---|---|---|---|
| 0.67/0.67 | 150 | 100° C. | 30 min. | 20 days | 85 |
| 1.0/1.0 | 120 | 100° C. | 30 min. | 20 days | 117 |
| 1.0/2.0 | 140 | 100° C. | 30 min. | 20 days | 97 |
| 1.0/2.5 | 120 | 100° C. | 30 min. | 20 days | 108 |

[a]Number of equivalents of EMZ AND MHHPA for 1 equivalent of epoxy group in Epon 834
[b]Cured at 100° C. for 30 minutes.

TABLE 4

| Epoxy compound (Number of equivalents) Amine compound (Number of equivalents) | | Softening temp. (°C.) | [a]Curing | | [a]Storage stability (40° C.) | [b]Glass transition temp. (°C.) |
|---|---|---|---|---|---|---|
| | | | temp. | time | | |
| Epon 828 | (1) | 100 | 100° C. | 1 hour | 14 days | 95 |
| EMZ | (0.67) | | | | | |
| Epon 834 | (1) | 110 | 100° C. | 1 hour | 2 days | 115 |
| EMZ | (1) | | | | | |
| Epon 834 | (1) | 130 | 100° C. | 1 hour | 20 days | 110 |
| EMZ | (0.67) | | | | | |
| Epon 828 | (1) | 90 | 120° C. | 1 hour | >20 days | 86 |
| PG-MZ | (0.7) | | | | | |

[a]Formulation shown in Example 3
[b]Cured at "Curing temp. time"

As shown in Table 2, the addition product of the present invention is a superior latent curing agent because it shows greatly improved storage stability in comprison to the compound containing an active hydrogen atom and tertiary amino group (control) alone. Further, as shown in Tables 3 and 4, the addition product of the present invention is a superior latent curing agent because it shows improved storage stability in comparison with the adduct prepared by reacting an amine compound and an epoxy compound, and it is posssible to obtain a superior latent curing agent over a wide range of reaction ratios of the amine compound.

EXAMPLE 4

The reactivity and storage stability of a combined system of the latent curing agent of the present invention and a dibasic acid hydrazide were tested. The formulation is as shown below and the results obtained are shown in Table 5. Formulation:

Epon 828: 100 parts by weight
Latent curing agent of the present invention: 20
Adipic dihydrazide: 8
ZnO: 5

It can be understood from the comparison of Table 2 with Table 5 that the latent curing agent of the present invention exerts a synergistic effect in combination with adipic dihydrazide in its reactivity property.

TABLE 5

| Sample No. | Reactivity | | | | Storage stability (30° C.) | [a]Glass transition temp. (°C.) |
|---|---|---|---|---|---|---|
| | $T_i$(°C.) | $T_p$(°C.) | Curing temp. | time | | |
| 1 | 126 | 140 | 100° C. | 1 hour | 1 month | 100 |
| 2 | 100 | 124 | 100° C. | 30 min. | 1 month | 94 |
| 3 | 126 | 136 | 120° C. | 30 min. | 1 month | 117 |
| 4 | 110 | 123 | 100° C. | 30 min. | 1 month | 110 |
| 5 | 123 | 140 | 100° C. | 30 min. | 1 month | 110 |
| 6 | 114 | 132 | 100° C. | 30 min. | 1 month | 75 |
| 7 | 120 | 136 | 100° C. | 1 hour | 1 month | 110 |
| 8 | 114 | 143 | 140° C. | 30 min. | 1 month | 100 |
| 9 | 135 | 144 | 120° C. | 30 min. | 1 month | 100 |
| 10 | 110 | 128 | 100° C. | 1 hour | 1 month | 104 |
| 11 | 120 | 130 | 100° C. | 30 min. | 1 month | 110 |
| 12 | 116 | 128 | 100° C. | 30 min. | 1 month | 108 |

TABLE 5-continued

| Sample No. | Reactivity $T_i$ (°C) | $T_p$ (°C) | Curing temp. | time | Storage stability (30° C.) | [a]Glass transition temp. (°C.) |
|---|---|---|---|---|---|---|
| 13 | 126 | 134 | 100° C. | 30 min. | 1 month | 107 |
| 14 | 110 | 126 | 100° C. | 30 min. | 1 month | 110 |
| 15 | 110 | 124 | 100° C. | 30 min. | 1 month | 104 |
| 16 | 146 | 166 | 140° C. | 1 hour | 1 month | 60 |

[a]Cured at "Curing temp. time"

EXAMPLE 5

The storage stability and curing ability of the combination of the latent curing agent of the present invention and a known latent curing agent were tested. The formulation and the results obtained are shown in Table 6. As shown in the table, the epoxy system containing the known latent curing agent above did not entirely cure at 120° C. for 1 hour. However, the combination of the latent curing agent and the known latent curing agent completely cured at 120° C. for 1 hour.

TABLE 6

| | Example | | | Control | | |
|---|---|---|---|---|---|---|
| Epon 828 | 100 | 100 | 100 | 100 | 100 | 100 |
| Sample No. 7 | 10 | 10 | 10 | — | — | — |
| dicyandiamido | 8 | | | 8 | | |
| melamine | | 10 | | | 10 | |
| benzoguanamine | | | 20 | | | 20 |
| Storage stability (30° C.) | >3 months | >3 months | >3 months | >3 months | >3 months | >3 months |
| Reactivity at 120° C., 1 hour | O | O | O | X | X | X |

EXAMPLE 6

The reactivity and the storage stability of the combination of embodiments of the present latent curing agent and an acid anhydride were tested. The base formulation is shown below and the results are shown in Table 7.

Formulation

Epon 828: 100 parts by weight
MHHPA: 85
Latent curing agent of the present invention: 5

TABLE 7

| Sample No. | Reactivity $T_i$ (°C.) | $T_p$ (°C.) | Curing temp. | time | Storage stability (30° C.) | [a]Glass transition temp. (°C.) |
|---|---|---|---|---|---|---|
| 4 | 118 | 148 | 120° C. | 1 hour | 1 week | 130 |
| 7 | 100 | 132 | 120° C. | 1 hour | 1 month | 135 |
| 15 | 118 | 142 | 120° C. | 1 hour | 3 weeks | 135 |
| 16 | 140 | 158 | 140° C. | 4 hours | >1 month | 98 |
| DMP-30 | 60 | 120 | 120° C. | 30 min. | 1 day | 114 |
| EMZ | 128 | 148 | 120° C. | 30 min. | 2 days | 118 |
| SMZ | 106 | 124 | 120° C. | 30 min. | 1 day | 130 |

[a]"Curring temp. time"

As shown in Table 7, the addition product of the present invention is a superior latent curing accelerator because it shows greatly improved storage stability and similar reactivity in comparison to an amine type of accelerator.

Having now fully described the invention, it will be apparent to one of ordinary skill in the art that many changes and modifications can be made thereto without departing from the spirit or scope of the invention as set forth herein.

What is claimed is:

1. A latent curing agent for epoxy resin, characterised in that the latent curing agent is an adduct obtained by reacting (a) a polyfunctional epoxy compound, (b) a compound having at least one OH, $NH_2$, NH or SH group together with a tertiary amino group in the molecule, and (c) a carboxylic acid anhydride.

2. A latent curing agent of claim 1, wherein said epoxy compound is a polyglycidyl ether, a polyglycidyl ether ester, a polyglycidyl ester, a glycidylamine, an epoxidized novolak and an epoxidized polyolefin.

3. A latent curing agent of claim 1, wherein said carboxylic acid anhydride is succinic anhydride, phthalic anhydride, tetrahydrophthalic anhydride, methyl tetrahydrophthalic anhydride, hexahydrophthalic anhydride, methyl hexahydrophthalic anhydride, methyl nadic anhydride, dodecenylsuccinic anhydride, pyromellitic dianhydride, or 5-(2,5-diketo-tetrahydrofuryl)-3-methyl-3-cyclohexene-1,2-dicarboxylic anhydride.

4. A latent curing agent of claim 1, wherein the compound of said component (b) is a compound of the formula:

(1)

wherein X is —OH, —$NH_2$, —NH, or —SH; $R_1$ and $R_2$ are $C_{1-20}$ alkyl groups, $C_{2-20}$ alkenyl groups, or aromatic hydrocarbon groups, optionally substituted with oxygen or halogen or one of the functional groups which define group X; and $R_3$ is a divalent counterpart or $R_1$ or $R_2$, and wherein $R_1$ and $R_2$ or $R_1$, $R_2$ and $R_3$ may connect with each other to form a ring.

5. A latent curing agent of claim 1, wherein the compound of said component (b) is a compound of the formula:

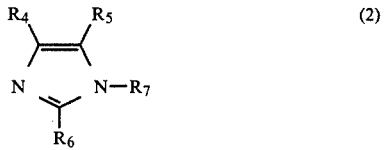

(2)

where $R_4$, $R_5$, $R_6$ and $R_7$ are hydrogen atoms, the groups defined by radicals $R_1$ and $R_2$, or the functional groups of substituent X of claim 4; with the proviso that $R_7$ is hydrogen or at least one of $R_4$ to $R_7$ is a functional group as defined for substituent X.

6. A latent curing agent of claim 1, wherein the compound of said component (b) is 2-dimethylaminethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris(dimethylaminomethyl)phenol, N-β-hydroxyethyl morpholine, 2-dimethylaminoethylamine, 3-dimethylamino-n-propylamine, 2-diethylaminoethylamine, 3-diethylamino-n-propylamine, N-methylpiperazine, imidazole, 2-methylimidazole, 2-ethylimidazole, 2-ethyl-4-methylimidazole, 2-isopropylimidazole, 2-undecylimidazole, 2-octadecylimidazole, 2-phenylimidazole, 2-phenyl-4-methylimidazole, 2-dimethylaminoethanethiol, methimazole, 2-mercaptobenzoimidazole, or 2-mercaptobenzothiazole.

7. A latent curing agent of claim 1, wherein the equivalent ratio of component (b) to component (a) ranges from 0.4 to 2 equivalents: 1 equivalent and the equivalent ratio of component (c) to component (a) ranges from 0.25 to 2.5 equivalents: 1 equivalent.

8. A latent curing agent of claim 7, wherein the equivalent ratio of component (b) to component (a) ranges from 0.5 to 1.5 equivalent, and the equivalent ratio of component (c) to component (a) ranges from 0.7 to 2.0 per one equivalent.

9. A one-pack curable epoxy resin composition, comprising:
    an epoxy resin in admixture with the addition product of claim 1.

10. A cured epoxy resin composition, comprising:
    an epoxy resin in admixture with addition product of claim 1.

11. The resin composition of claim 9 and 10, wherein from 0.5 to 40 parts by weight of said addition product is combined with 100 parts by weight of said epoxy resin.

* .* * * *